US011748313B2

(12) United States Patent
Rashid et al.

(10) Patent No.: US 11,748,313 B2
(45) Date of Patent: Sep. 5, 2023

(54) OPTIMIZING FILE-SYSTEM RESOURCE RESERVATION

(71) Applicant: EMC IP Holding Company LLC, Hopkinton, MA (US)

(72) Inventors: Ahsan Rashid, Edison, NJ (US); Morgan A. Clark, South Orange, NJ (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 15 days.

(21) Appl. No.: 17/508,082

(22) Filed: Oct. 22, 2021

(65) Prior Publication Data

US 2023/0131270 A1    Apr. 27, 2023

(51) Int. Cl.
*G06F 16/176* (2019.01)
*G06F 16/17* (2019.01)
*G06F 16/178* (2019.01)
*G06F 16/188* (2019.01)

(52) U.S. Cl.
CPC ........ *G06F 16/1774* (2019.01); *G06F 16/178* (2019.01); *G06F 16/1727* (2019.01); *G06F 16/188* (2019.01)

(58) Field of Classification Search
CPC ............... G06F 16/1774; G06F 16/188; G06F 16/1727; G06F 16/178
See application file for complete search history.

(56) References Cited

U.S. PATENT DOCUMENTS

| | | | |
|---|---|---|---|
| 9,753,758 B1* | 9/2017 | Oldenburg | H04L 41/122 |
| 2005/0246401 A1* | 11/2005 | Edwards | G06F 3/0665 |
| 2008/0243846 A1* | 10/2008 | Rasmussen | G06F 16/1774 |
| 2012/0158684 A1* | 6/2012 | Lowenstein | G06F 9/526 |
| | | | 707/704 |
| 2014/0280162 A1* | 9/2014 | Halpern | G06F 16/22 |
| | | | 707/737 |
| 2016/0117267 A1* | 4/2016 | Witt | G06F 12/1466 |
| | | | 711/111 |
| 2017/0255668 A1* | 9/2017 | Schnell | G06F 16/273 |
| 2017/0286445 A1* | 10/2017 | Gowdappa | G06F 16/1774 |
| 2019/0332446 A1* | 10/2019 | Nilsen | G06F 9/524 |
| 2020/0026451 A1* | 1/2020 | Jia | G06F 16/188 |
| 2020/0301880 A1* | 9/2020 | George | G06F 16/148 |
| 2020/0348863 A1* | 11/2020 | Venkatesan | G06F 3/0659 |

* cited by examiner

*Primary Examiner* — Matthew J Ellis
(74) *Attorney, Agent, or Firm* — Amin, Turocy & Watson, LLP

(57) ABSTRACT

Optimizing file system resource reservation is presented herein. The method comprises dividing a virtual file system address space into subspaces, initializing the subspaces with volume slices of a group of volume slices comprising a first volume slice, a second volume slice, and a collection of reserved volume slices allocated based on an allocation pattern that allocates volume slices as a function of a quantitative relationship between a first value associated with a first volume slice and a second value associated with a second volume slice, determining that a data block count is insufficient to service a write operation of user data to the second volume slice; and provisioning a second subspace with a free volume slice obtained from the collection of reserved volume slices, and wherein the provisioning of the second subspace with the free volume slice is performed without invoking a memory exclusion mechanism.

20 Claims, 10 Drawing Sheets

OPTIMIZING FILE-SYSTEM RESOURCE RESERVATION

TECHNICAL FIELD

The subject disclosure generally relates to embodiments for optimizing file-system resource reservation.

BACKGROUND

Storage file systems (FSs) such as the UFS64 file system can comprise many resource types like index nodes (inodes), data blocks, metadata blocks, and similar resource types. Generally, a FS prior to accepting new data writes from user equipment must typically check to ensure that the FS has sufficient resources to accommodate and complete a data write request operation. The check to ensure that there are sufficient resources to fulfill the data write request operation is particularly pertinent for uncached writes where the FS accepts data in its cache and returns notification of success to the invoking user equipment, and writes the data to persistent media asynchronously. With parallel writes occurring, the FS uses locking primitives to check and reserve free space so that multiple threads do not reserve the same group of resources. In systems with small numbers of processor cores, the use of locking primitives does not pose a significant problem. However, in systems with large numbers of processor cores, using locking primitives can become a bottleneck and a severe cause of latency in the performance of allocating resources to fulfill data write request operations.

BRIEF DESCRIPTION OF THE DRAWINGS

Non-limiting embodiments of the subject disclosure are described with reference to the following figures, wherein like reference numerals refer to like parts throughout the various views unless otherwise specified.

DETAILED DESCRIPTION

Figure 1:
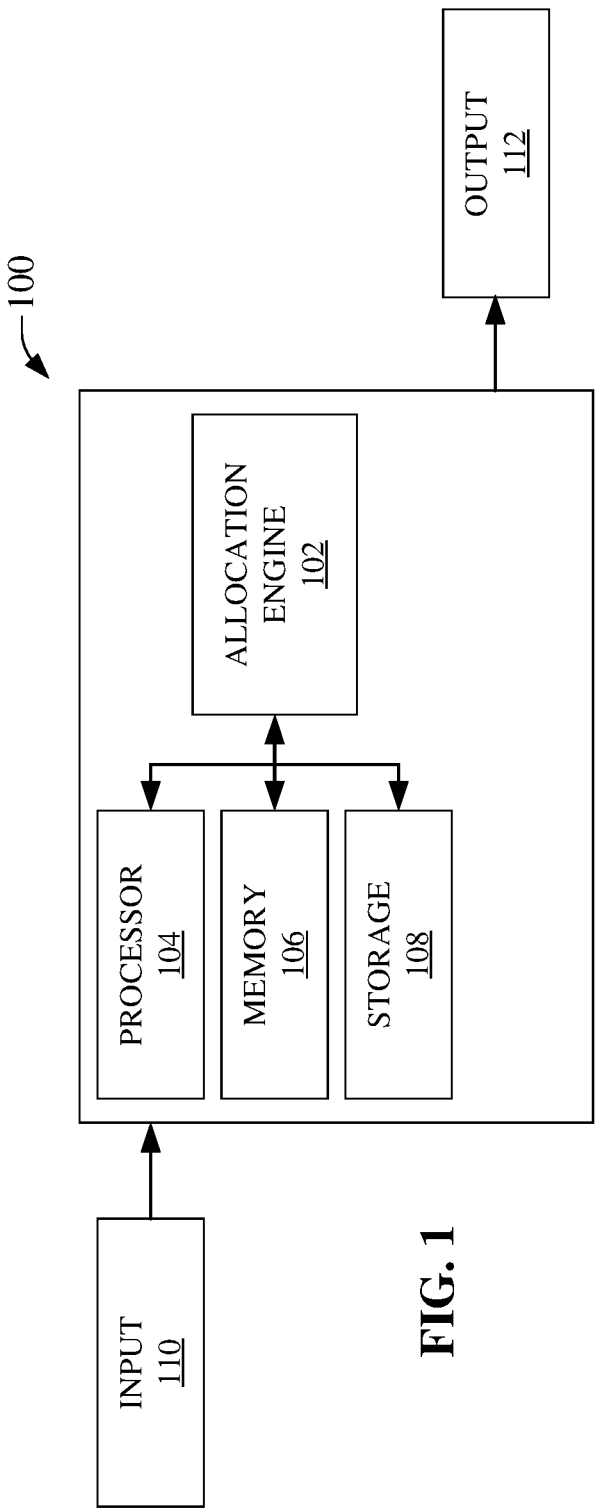
FIG. 1 illustrates a block diagram of a system for optimizing file system resource reservation, in accordance with various example embodiments.

Aspects of the subject disclosure will now be described more fully hereinafter with reference to the accompanying drawings in which example embodiments are shown. In the following description, for purposes of explanation, numerous specific details are set forth in order to provide a thorough understanding of the various embodiments. However, the subject disclosure may be embodied in many different forms and should not be construed as limited to the example embodiments set forth herein.

In regard to the implementation of the subject disclosure, it should be noted that synchronization and locking primitives are typically not needed during the provisioning of volume slices into the FS in response to satisfying resource allocation requests since resource allocation requests, as described infra, can be independent of whether or not a volume slice needs to be added. In prior methods each resource allocation request operation has taken the use of a lock mechanism to reserve space. This is because the space required may be coming from provisioned slices or un-provisioned volume slices, and in the prior methods the un-provisioned volume slices were not reserved.

In the methods described in the context of the subject disclosure, since un-provisioned volume slices are reserved, the overall free resource count of a given resource type can include resources from both provisioned and un-provisioned reserved volume slices. Thus the input/output (I/O) operation does not need to instantiate a synchronization or lock mechanism. The I/O operation can use simple atomic operations to reserve space.

The disclosed systems and methods, in accordance with various embodiments, provide a system, apparatus, or device comprising: a processor; and a memory that stores executable instructions that, when executed by the processor, facilitate performance of operations. The operations can comprise: determining a number of volume slices associated with a storage volume of a group of storage volumes, dividing the storage volume into the number of volume slices, assigning a first volume slice of the number of volume slices for use by a first resource type data, assigning a second volume slice of the number of volume slice for use by a second resource type data, assigning a third volume slice of the number of volume slices for use by a third resource type data, assigning a fourth volume slice of the number of volume slices for use by a fourth resource type data, and assigning a remainder of the number of volume slices as being free volume slices, based on a storage capacity of the storage volume, generating a virtual file system address space, partitioning the virtual file system address space into a first subspace based on the first resource type data, a second subspace based the second resource type data, a third subspace based on the third resource type data, and a fourth subspace based on the fourth resource type data, provisioning the first subspace with the first volume slice, provisioning the second subspace with the second volume slice, provisioning the third subspace with the third volume slice, and provisioning the fourth subspace with the fourth volume slice, reserving, based on a defined free volume slice allocation pattern, at least a first free volume slice for use by the first resource type data, reserving at least a second free volume slice for use by the second resource type data, reserving at least a third free volume slice for use by the third resource type data, and reserving at least a fourth free volume slice for use by the fourth resource type data; and facilitating read and write access to the virtual file system address space.

Additional operations can comprise determining that the first volume slice has become full, and provisioning the first subspace with the first free volume slice, determining that the first free volume slice reserved based on the defined free volume slice allocation pattern is insufficient to provision the first subspace, initiating a synchronization mechanism to prevent access to the virtual file system address space, reallocating at least one of the fourth free volume slice to be used as the first free volume slice, and releasing the synchronization mechanism to permit access to the virtual file system address space.

Another operation can include determining that the fourth volume slice is becoming full, and provisioning the fourth subspace with the fourth free volume slice without using a synchronization mechanism to prevent access to the virtual file system address space.

In the context of the foregoing, the synchronization mechanism can be a spinlock directive, and the first subspace can be used to store inode type data, the second subspace, the third subspace, and the fourth subspace can be larger than the first subspace, the defined free volume slice allocation pattern can be based on a ratio of a relative size of each of the first subspace, the second subspace, the third subspace, and the fourth subspace, and wherein each of the first free volume slice, the second free volume slice, the third free volume slice, the fourth free volume slice, and each of the remainder of the number of volume slices can comprise a defined number of data blocks.

In accordance with further embodiments, the subject disclosure describes a method, comprising a series of acts that can include: partitioning, by a device comprising a processor, a virtual file system address space into a first subspace based on first resource usage type data and a second subspace based on second resource type usage type data, provisioning, by the device, the first subspace with a first volume slice of a group of volume slices associated with the first resource usage type data, and provisioning, by the device, the second subspace with a second volume slice of the group of volume slices associated with the second resource type data, wherein the group of volume slices comprises the first volume slice, the second volume slice, and a collection of reserved volume slices that are allocated between the first volume slice and the second volume slice based on a defined distribution allocation pattern that allocates the first volume slice and the second volume slice as a function of a quantitative relationship between a first number value associated with the first volume slice and a second number value associated with the second volume slice, determining, by the device, that a data block count associated the second volume slice is insufficient to service a write operation of user data to the second volume slice, and provisioning, by the device, the second subspace with a free volume slice associated with the second resource usage type data, wherein the free volume slice is obtained from the collection of reserved volume slices.

Further acts can comprise wherein the free volume slice is a second free volume slice, determining, by the device, that a first free volume slice of the collection of reserved free volume slices associated with the first resource usage type data is insufficient to provision the first subspace, initiating, by the device, a memory synchronization mechanism to exclude access to the virtual file system address space, reassigning, by the device, a second free volume slice of the collection of reserved free volume slices associated with the second resource usage type data to be a third free volume slice of the collection of reserved free volume slices associated with the first resource usage type data, and releasing, by the device, the memory synchronization mechanism and allowing access to the virtual file system address space.

In accordance with still further embodiments, the subject disclosure describes a machine-readable storage medium, a computer readable storage device, or non-transitory machine-readable media comprising instructions that, in response to execution, cause a computing system comprising at least one processor to perform operations. The operations can comprise: dividing a virtual file system address space into a first subspace based on first resource usage type data and a second subspace based on second resource type usage type data, initializing the first subspace with a first volume slice of a group of volume slices associated with the first resource usage type data, and initializing the second subspace with a second volume slice of the group of volume slices associated with the second resource type data, wherein group of volume slices comprises the first volume slice, the second volume slice, and a collection of reserved volume slices that are allocated between the first volume slice and the second volume slice based on a defined allocation pattern that allocates the first volume slice and the second volume slice as a function of a quantitative relationship between a first number value associated with the first volume slice and a second number value associated with the second volume slice, determining that a data block count associated the second volume slice is insufficient to service a write operation of user data to the second volume slice, and provisioning the second subspace with a free volume slice associated with the second resource usage type data, wherein the free volume slice is obtained from the collection of reserved volume slices, and wherein the provisioning of the second subspace with the free volume slice is performed without invoking a memory exclusion mechanism.

In regard to the foregoing the first resource usage type data can be associated with inode type data, and the second resource usage type data can be associated with user type data.

Now in reference to the Figures. FIG. 1 depicts a system 100 that provides for optimizing file system resource reservation, in accordance with various example embodiments. System 100, for purposes of illustration, can be any type of mechanism, machine, device, facility, apparatus, and/or instrument that includes a processor and/or is capable of effective and/or operative communication with a wired and/or wireless network topology. Mechanisms, machines, apparatuses, devices, facilities, and/or instruments that can comprise system 100 can include tablet computing devices, handheld devices, server class computing devices, machines, and/or databases, laptop computers, notebook computers, desktop computers, cell phones, smart phones, consumer appliances and/or instrumentation, industrial devices and/or components, hand-held devices, personal digital assistants, multimedia Internet enabled phones, multimedia players, and the like.

System 100 can comprise allocation engine 102 that can be in operative communication with processor 104, memory 106, and storage 108. Allocation engine 102 can be in communication with processor 104 for facilitating operation of computer-executable instructions or machine-executable instructions and/or components by allocation engine 102, memory 106 for storing data and/or computer-executable instructions and/or machine-executable instructions and/or components, and storage 108 for providing longer term storage of data and/or machine-readable instructions and/or computer-readable instructions. Additionally, system 100 can also receive input 110 for use, manipulation, and/or transformation by allocation engine 102 to produce one or more useful, concrete, and tangible result, and/or transform one or more articles to different states or things. Further, system 100 can also generate and output the useful, concrete, and tangible result and/or the transformed one or more articles as output 112.

System 100 in conjunction with allocation engine 102 can receive as input 110 a command to mount a storage volume. Allocation engine 102, in response to receiving the command to mount the storage volume, based on the dimensions of the storage volume at issue, can divide the storage volume into slices representing groups of blocks. For purposes of this disclosure the slices can be 256 megabytes (MB) in size, however, as will be appreciated by those ordinarily skilled in the art larger or smaller slice sizes can be employed with equal functionality and facility without departing from the ambit of the subject disclosure. Allocation engine 102 can then assign a defined number of the slices to differing resource types, such as an index node (inode) resource type; metadata block (MDB) resource type, shadow resource type, and data resource type. In certain embodiments, allocation engine 102 can allocate a first volume slice to represent an inode resource type; a second volume slice to represent a MDB resource type; a third volume slice to represent a shadow resource type, and a fourth volume slice to represent a data resource type. Additional volume slices created during the division of the storage volume at this juncture can be designated as being free volume slices (e.g., free volume slices do not represent any resource type). In regard to the disclosed resource types, while four resource types (e.g., inode, MDB, shadow, and data) have been enumerated, other resource types are contemplated as falling within the scope of this disclosure.

Figure 5:
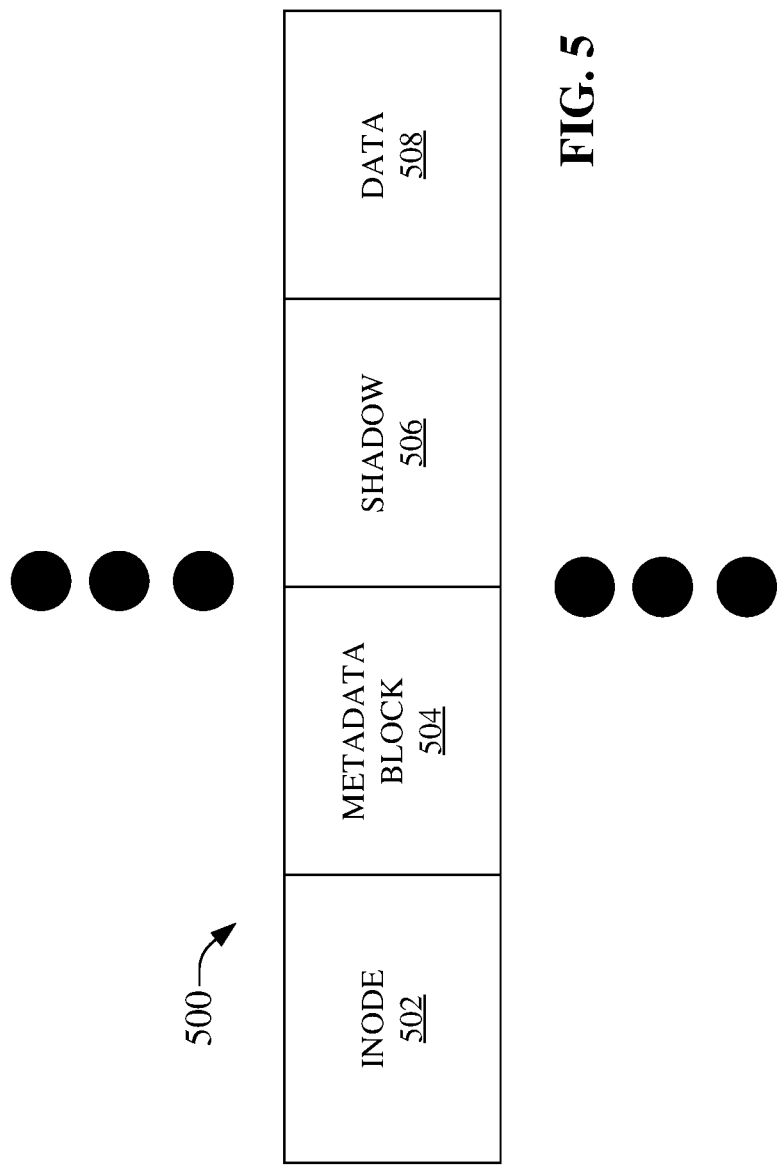
FIG. 5 illustrates a virtual file system address space comprising one or more subspaces, in accordance with various example embodiments.

Once allocation engine 102 has divided the storage volume into slices, allocation engine 102 can generate a virtual file system address space. The virtual file system address space can be extremely large, in the region of many petabytes (PBs), wherein a PB is $2^{50}$ bytes. Moreover, it should be observed allocation engine 102 can contemporaneously control multiple virtual file system address spaces of equivalent sizes. On completion of generating the virtual file system address space, allocation engine 102 can partition the virtual file system address space into resource type partitions. For instance, allocation engine 102 can partition the virtual file system address space into a first subspace (e.g., an inode address subspace); a second subspace (e.g., a MDB address subspace); a third subspace (e.g., a shadow address subspace); and a fourth subspace (e.g., a data address subspace). With reference to FIG. 5, the virtual file system address space 500 is illustrated as comprising an inode address subspace 502, a metadata block (MDB) address subspace 504, a shadow address subspace 506, and a data address subspace 508. In some embodiments, allocation engine 102 can allocate 32 terabytes (TB) for use by the inode address subspace 502, 4 PB for use by the MDB address subspace 504, 1 PB can be allocated for use by the shadow address subspace 506, and 8 PB can be employed for use by the data address subspace 508. As will be noted the partition sizes of respective subspaces are illustrative, other differing respective partition sizes are contemplated as falling within the ambit of this disclosure.

Allocation engine 102 can thereafter provision each of the respective subspaces with a respective volume slice. For instance, allocation engine 102 can provision the inode address subspace 502 with a volume slice assigned for use by the inode address subspace 502. Similarly, allocation engine 102 can: provision the MDB address space 504 with a volume slice assigned for use by the MDB address space 504, provision the shadow address space 506 with a volume slice designated for use by the shadow address space 506, and provision the data address space 508 a volume slice designated for use by the data address space 508.

Figure 6:
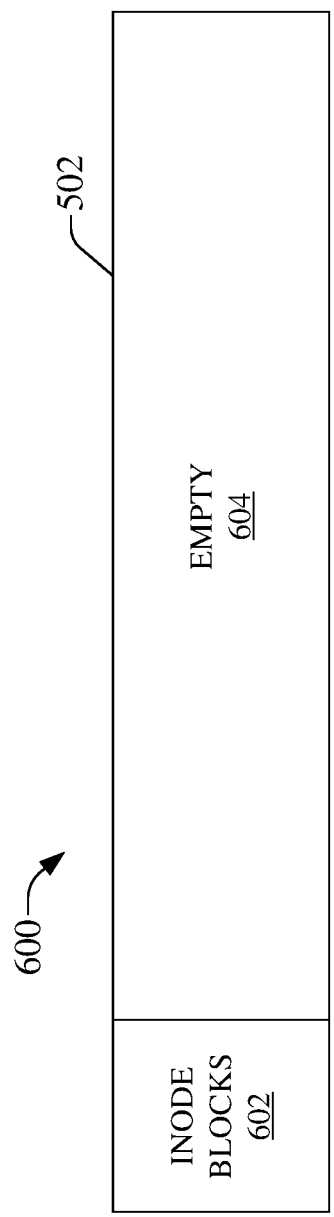
FIG. 6 illustrates a subspace of a virtual file system address space, in accordance with various example embodiments.

An illustration 600 of an example inode address subspace 502, after the inode address subspace has been provisioned is depicted in FIG. 6. As depicted, inode address subspace 502 can comprise an inode block 602 portion and an empty portion 604. The inode block 602 can be the volume slice with which allocation engine 102 has provisioned the inode address subspace 502. The empty portion 604 can comprise space within the inode address subspace 502 that has yet to be provisioned, by allocation engine 102, with volume slices (e.g., data blocks); the empty portion 604 of the inode address subspace 502 can be un-provisioned with volume slices and as such is not in use. It should be noted that the empty portion 604 is typically not accessible until allocation engine 102 provisions the address space with volume slices. In regard to the foregoing, it should be noted that the other address subspaces can also be provisioned in a similar manner, and further it should observed that the address subspaces are not typically accessible for use until allocation engine 102 has provisioned an address subspace with a volume slice associated with the resource type.

Figure 7:
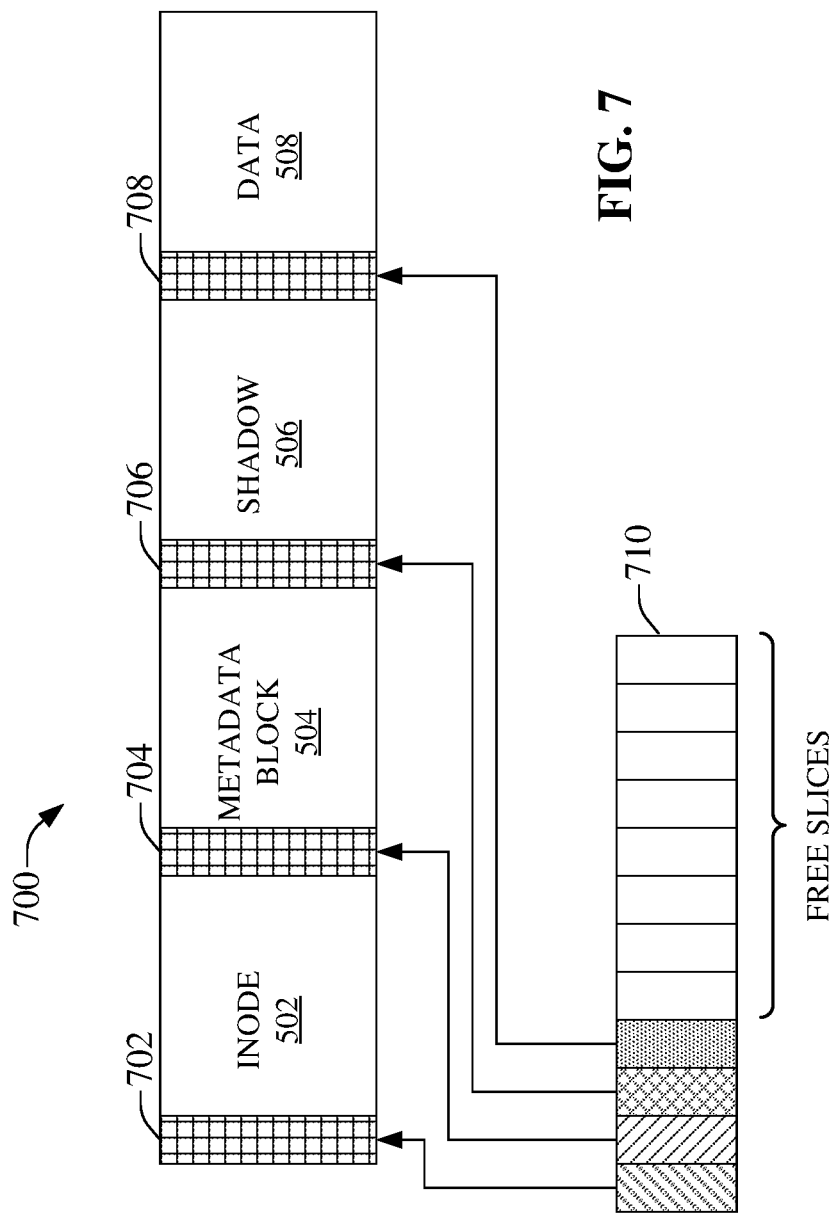
FIG. 7 illustrates provisioning a virtual files system address space with one or more volume slices based on respective resource type data, in accordance with various example embodiments.

Turning briefly to FIG. 7, once allocation engine 102 has provisioned each of the virtual file system address subspaces with pertinent volume slices based on resource type, each of the address subspaces can have been provisioned with a respective volume slice from volume 710. As illustrated, inode subspace 502 can comprise an inode resource type volume slice 702 (e.g., a group of file system blocks associated with an inode resource type data); MDB subspace 504 can comprise a MDB resource type volume slice 704 (e.g., a group of file system blocks particularly associated with an MDB resource type data); shadow subspace 506 can comprise a shadow resource type volume slice 706 (e.g., a group of file system blocks particularly associated with shadow resource type data); and data subspace 508 can comprise a data resource type volume slice 708 (e.g., a group of file system blocks particularly associated with data resource type data). In addition, it will be observed that volume 710 can comprise a group of free slices. This group of free slices has been illustrated as being un-shaded. The group of free slices can be used for any resource type data. However, to date, to make use of this group of free slices has required the use of synchronization mechanism each and every time a volume slice has had to be added to the virtual file system address space, or more particularly, every time that a free slice has had to be assigned for use as defined resource type (e.g., inode, MDB, shadow, or data) and thereafter being provisioned into the virtual file system address space. This need to initiate a synchronization mechanism such as lock, assign a resource type to a free volume slice, provision the volume slice into the virtual file system, and thereafter release the synchronization mechanism has led to significant processing latencies, especially in multi-core, multi-threaded processor environments.

In order to obviate or mitigate the foregoing latencies, allocation engine 102 can pre-assign (or reserve) resource types to the free volume slices based on a defined allocation pattern. For example, in some embodiments, approximately 12.5% of the free volume slices can be reserved as being for the use of inode resource type data, approximately 25% of the free volume slices can be reserved as being for the use of MDB resource type data, approximately 12.5% of the free volume slices can be reserved as being for the use for shadow resource type data, and approximately 50% of the free volume slices can be reserved as being for the use of data resource type data. In other embodiments, the defined allocation pattern of the entire volume (inclusive of both the already provisioned slices and the free un-provisioned slices) can be based on a ratio of volume slices to one another. For instance, the defined allocation pattern can be 2:3:2:5, wherein the slices of the entire volume can be allocated such that there are 2 volume slices pre-assigned for inode resource type data, 3 volume slices pre-assigned for MDB resource type data, 2 volume slices pre-assigned for shadow resource type data, and 5 volume slices pre-assigned for data resource type data.

Figure 8:
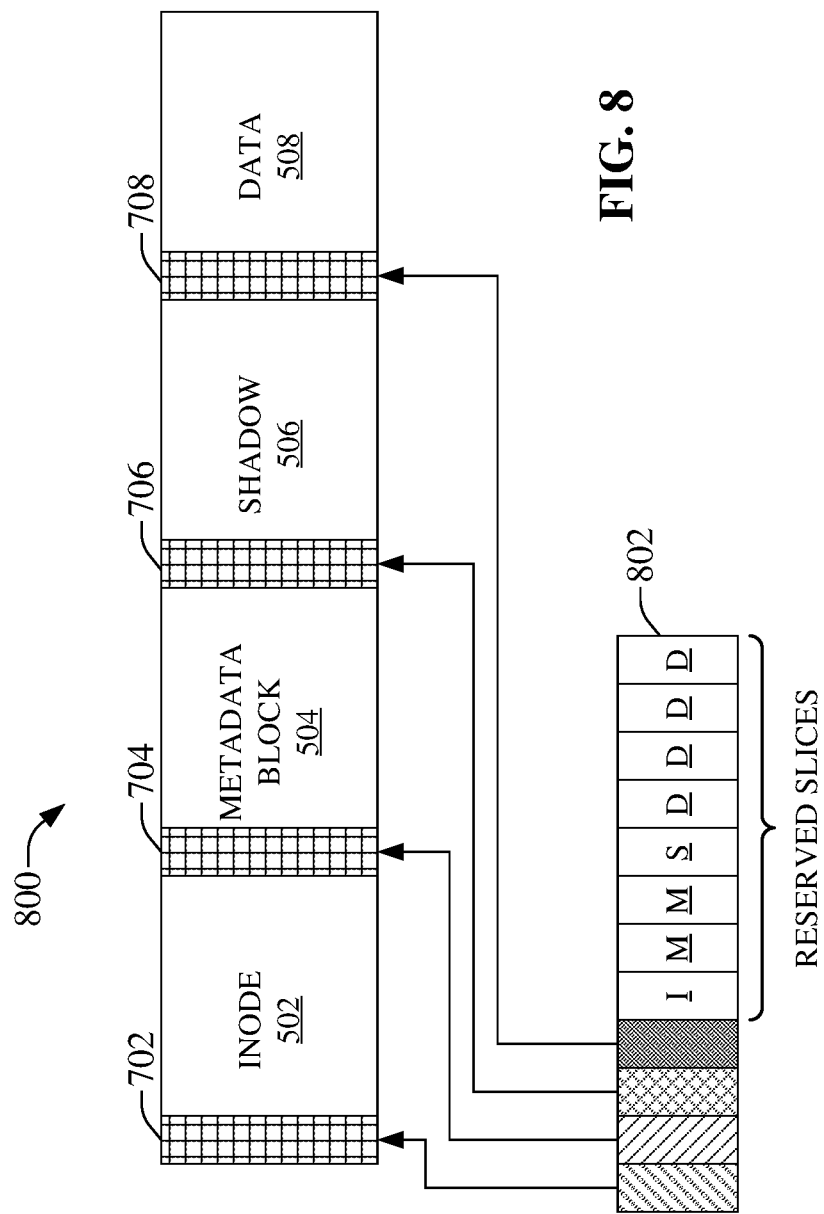
FIG. 8 illustrates provisioning a virtual files system address space with one or more volume slices based on respective resource type data, in accordance with various example embodiments.

As illustrated in FIG. 8, allocation engine 102 has reserved free volume slices of volume 802 in accordance with a 1:2:1:4 pattern. Thus, there can be one volume slice reserved for use by inode resource type data (I); two volume slices reserved for use by MDB resource type data (M), one volume slice reserved for use by shadow resource type data (S), and four volume slices are reserved for data resource type data (D). The respective reserved volume slices can be considered a pool of volume slices 802 that can be drawn on such that when the provisioned volume slices (e.g., inode slice 702, MDB slice 704, shadow slice 706, and data slice 708) reach, or are nearing, their respective limits, an appropriate volume slice from the pool of volume slices 802 can be added to the appropriate subspace without the need to engage synchronization and locking mechanisms in order to facilitate adding a volume slice from the pool of volume slices to the virtual file system address space (and the appropriate subspace). For example, if it is determined, by allocation engine 102, that the already provisioned data slice 708 is nearing exhaustion, allocation engine 102 can provision the data resource type subspace (e.g., 508) with one of the four volume slices that can have been reserved for use by the data resource type subspace. This can result in the data resource type subspace 508 being provisioned with two volume slices, with now only three data resource type volume slices remaining in the pool of volume slices.

In the context of FIG. 8, it should be noted that while the un-provisioned slices (e.g., reserved slices 802) have been illustrated for the purposes of exposition as having been associated with particular resource types, the subject disclosure however is not so limited. In various embodiments, the allocation and reservation of the un-provisioned slices can remain a number value until a volume slice has to be provisioned into a resource type subspace. The un-provisioned slices can remain unaffiliated until such time as an already provisioned resource type slice is nearing exhaustion, at which time allocation engine 102 can identity an un-provisioned unaffiliated slice of the reserved slices 802 to be provisioned to service the resource type subspace based on the defined allocation pattern; it is at this instance in time that the un-provisioned unaffiliated volume slice becomes associated with a particular resource type.

Figure 2:
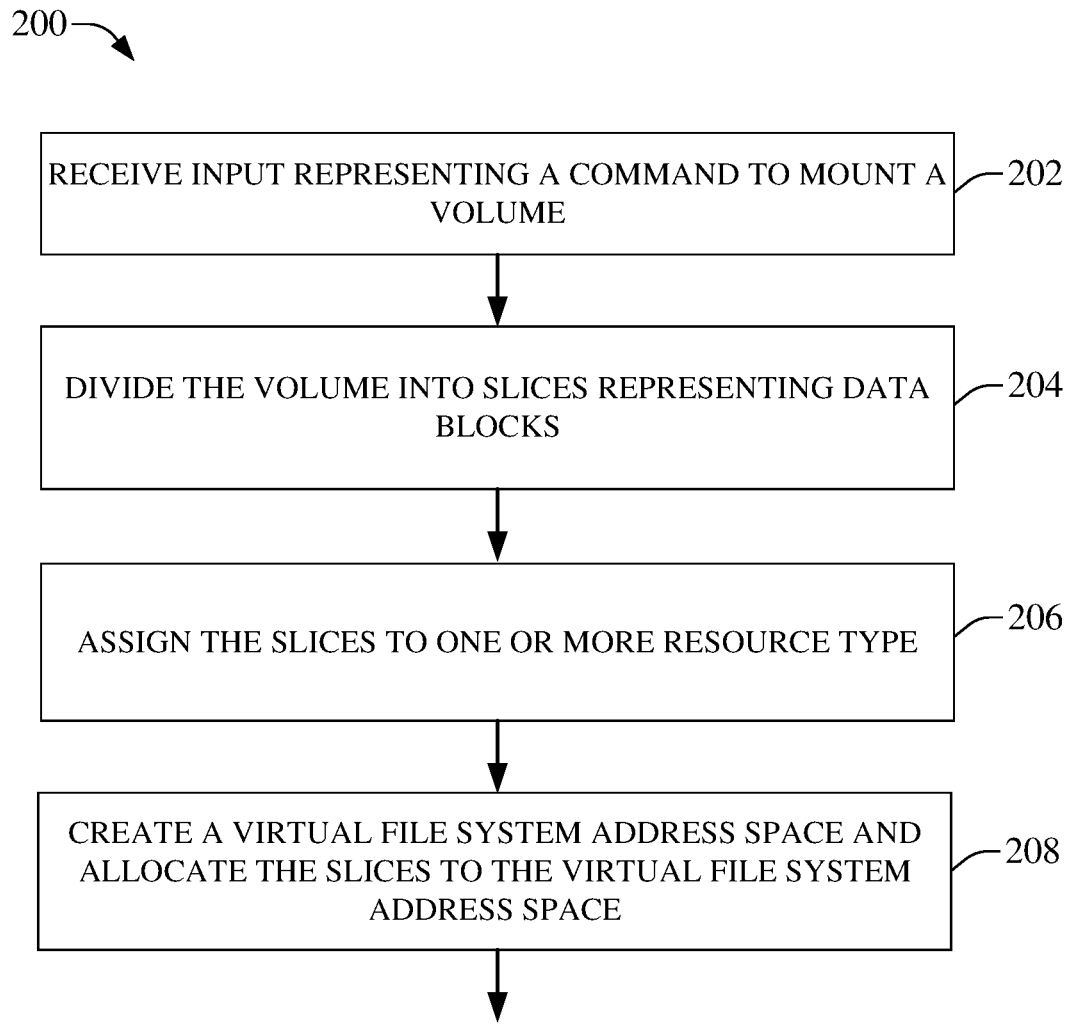
FIG. 2 illustrates a flow chart or a method for optimizing file system resource reservation, in accordance with various example embodiments.
Figure 3:
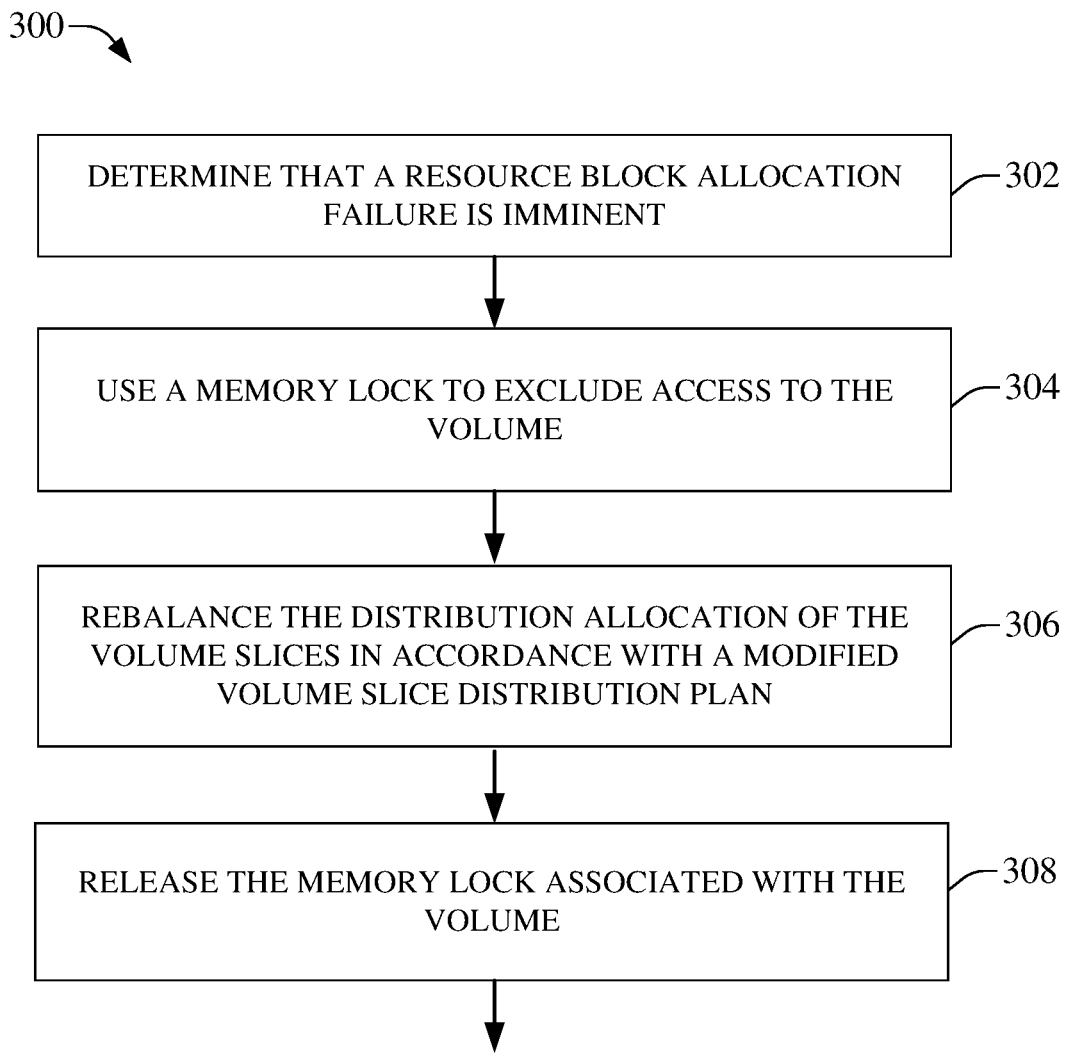
FIG. 3 illustrates yet a further flow chart or a method for optimizing file system resource reservation, in accordance with various example embodiments.
Figure 4:
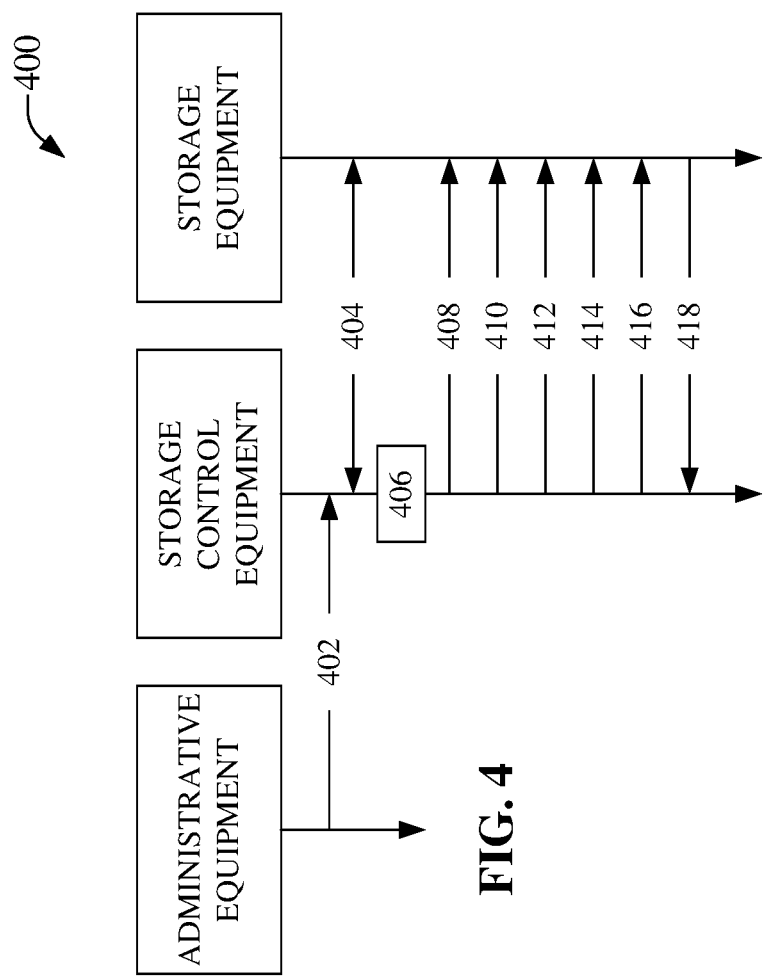
FIG. 4 depicts a further flow chart or a method for optimizing file system resource reservation, in accordance with various example embodiments.

FIGS. 2-4 illustrate flowcharts and/or methodologies for performing operations corresponding to system 100, in accordance with various example embodiments. For simplicity of explanation, the methodologies are depicted and described as a series of acts. It is to be understood and appreciated that various embodiments disclosed herein are not limited by the acts illustrated and/or by the order of acts. For example, acts can occur in various orders and/or concurrently, and with other acts not presented or described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Referring now to FIG. 2, a methodology 200 for optimizing file system resource reservation is illustrated, in accordance with various example embodiments. The method 200 can commence at act 202 wherein storage control equipment can receive a command to mount a volume. At act 204 the volume can be divided into volume slices representing data blocks. As noted above each volume slice can be 256 MB in size. Further, at act 206 a defined number of the volume slices can be assigned to be reserved for use by respective resource type data. For example, at act 206 a first volume slice can be reserved for use by inode resource type data, a second volume slice can be reserved for use by MDB resource type data, and third volume slice can be reserved for use by shadow resource type data, and a fourth volume slice can be reserved for use data resource type data. It should be observed that at act 206 that at this juncture there is a one to one (1:1) correspondence between the volume slice to resource type data (e.g., a single volume slice is allocated for use by a first resource type data, a single volume slice is allocated for use by a second resource type data, a single volume slice is allocated for use by a third resource type data, . . . ). After the volume slices have been created and a defined number of volume slices have been associated with resource type data, a virtual file system address space can be generated as a function of the dimensional metrics associated with the volume at act 208. As has been noted above, the virtual file system address space can be many petabytes or many yottabytes (YB) (e.g., $2^{80}$ bytes) in dimension. Further the virtual file system address space can also be partitioned into one or more subspaces based at least in part on a resource type (e.g., inode, MDB, shadow, data, and/or similar resource types). The sizes of the one or more subspaces can differ. For instance, in some embodiments, a first resource type subspace partition can be 32 TB, the second resource type subspace partition can be 4 PB, the third resource type subspace partition can be 1 PB, and the fourth resource type subspace partition can be 8 PB. Also, at act 208 the respective one or more subspace partitioned associated with the respective resource type data can be provisioned with the respective volume slices that have been associated with resource type data. For example, the inode subspace partition can be provisioned with an inode volume slice; the MDB subspace partition can be provisioned with a MDB volume slice, etc.

FIG. 3 depicts a further methodology 300 for optimizing file system resource reservation, in accordance with various example embodiments. In particular, method 300 pertains to situations where there has been a volume slice resource allocation mismatch. For instance, when it is determined that there are too few inode type resource type volume slices to properly service incoming write requests. The method 300 can commence at act 302 where it can be determined that a volume slice resource allocation failure is imminent. At act 304 a memory lock mechanism can be used to exclude access to the volume. At act 306 a rebalancing of the distribution allocation of the volume slices can be facilitated based on a modified slice distribution plan. In accordance with rebalancing the distribution of volume slices due, for example, to a shortage of inode volume slices, another volume slice that can have earlier been reserved for another resource type, for example, a volume slice reserved for data resource type data, can be reallocated as being reserved for use as a inode volume slice. Once the redistribution of volume slices has completed, at act 308, the memory lock mechanism can be released.

It will be observed from the foregoing that volume slices that have been reserved for a particular resource type have a certain degree of elasticity, such that when a first volume slice has been associated with a first resource type, the first volume slice can be associated with a second resource type by initiating a synchronization mechanism to exclude write access to the volume (and consequently to the virtual file system address space), performing a rebalancing of the volume slices in accordance with a defined redistribution pattern, and thereafter releasing the synchronization mechanism in order to make the volume (and its volume slices) and the virtual file system address space accessible once again to write requests. It should be observed that during the implementation of the synchronization mechanism to exclude write access to the volume and the rebalancing of the volume slices in accordance with the defined redistribution pattern, that the virtual file system address space remains accessible to read requests.

FIG. 4 illustrates a flowchart or method 400 for optimizing file system resource reservation in accordance with various example embodiments. The flowchart can commence at act 402 wherein a command to mount a storage volume can be received from administrative equipment (e.g., user equipment), by storage control equipment (e.g., front end storage equipment associated with storage equipment). At act 404 the storage control equipment and the storage equipment can communicate with one another to determine the dimensional metrics of a storage volume. At act 406 the storage control equipment, based at least in part on the dimensional metrics associated with the storage volume, can determine a number of volume slices that the storage volume can be divided into and cause the storage volume to divide the volume into the determined number of volume slices. At act 408 the storage control equipment can facilitate the storage equipment to assign resource type indicators to a defined number of the volume slices. As mentioned earlier, for ease of exposition the subject disclosure is described as employing four resource type indicators (e.g., inode, MDB, shadow, and data), however a greater or smaller number of resource type indicators can be used with equal facility and/or functionality. Thus, at act 408 a first volume slice can be designated as being for use by inode resource type data, a second volume slice can be designated as being for use by MDB resource type data, a third volume slice can be designated as being for use by shadow resource type data, and a fourth volume slice can be designated as being for use by data resource type data. At act 410, based on the storage volume dimensional data, a virtual file system address space can be generated or created. At act 412 the virtual file system address space can be partitioned into one or more data resource type based subspaces. Since the subject disclosure has been described as using four resource type based indicators, the virtual file system address space has also be partitioned into four corresponding resource type subspaces. The subspace partitions can be of varying sizes.

At act 414 each of the one or more data resource type based subspaces can be provisioned with an appropriate data resource type based volume slice. For example, the inode resource type subspace can be provisioned with an inode resource type volume slice; the MDB resource type subspace can be provisioned with an MDB resource type volume slice; the shadow resource type subspace can be provisioned with a shadow resource type volume slice, and the data resource type subspace can be provisioned with a data resource type volume slice. At act 416 the remaining volume slices that can have been created—the volume slices that have not been assigned resource type indicators—can be reserved for use by the respective subspaces based on an allocation pattern. For instance, from the remaining volume slices a first defined number of volume slices can be reserved for use by a first resource type subspace, a second defined number of volume slices can be reserved for use by a second resource type subspace, etc. At act 418 the storage equipment can indicate to the storage control equipment that the volume and its associated virtual file system address space is ready for access and to service read and/or write operations.

Figure 9:
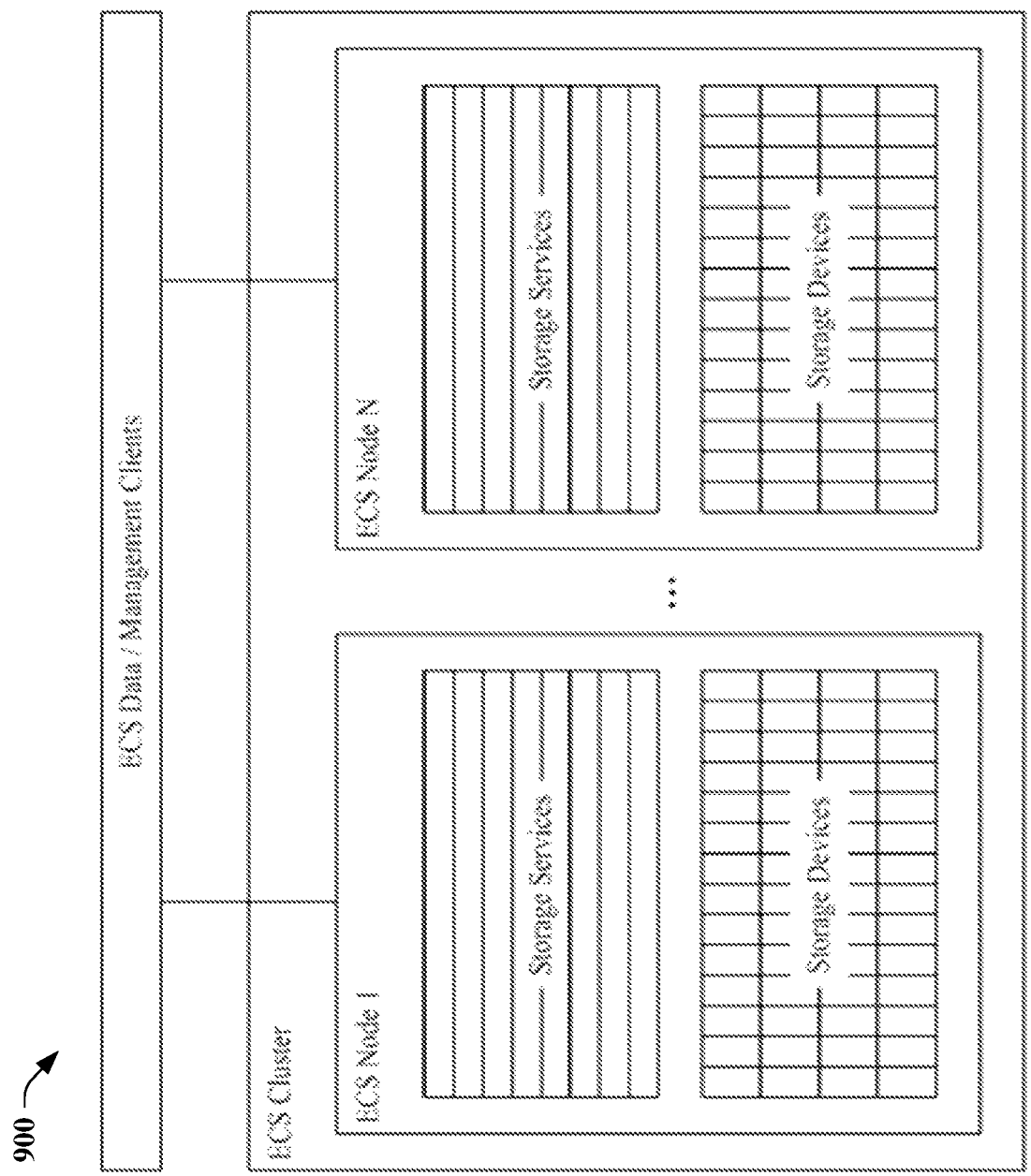
FIG. 9 illustrates an elastic cloud storage (ECS) system, in accordance with various example embodiments.

FIG. 9 illustrates an ECS storage system comprising a cloud-based object storage appliance in which corresponding storage control software comprising, e.g., ECS data client(s), ECS management client(s), storage service(s), etc. and storage media, e.g., physical magnetic disk media, storage devices, etc. of respective ECS nodes of an ECS cluster, are combined as an integrated system with no access to the storage media other than through the ECS system.

In this regard, an ECS cluster comprises multiple nodes, storage nodes, ECS nodes, etc. Each node is associated with storage devices, e.g., hard drives, physical disk drives, storage media, etc. In embodiment(s), an ECS node executing on a hardware appliance can be communicatively coupled, connected, cabled to, etc., e.g., 15 to 120 storage devices. Further, each ECS node can execute one or more services for performing data storage operations described herein.

The ECS system is an append-only virtual storage platform that protects content from being erased or overwritten for a specified retention period. In particular, the ECS system does not employ traditional data protection schemes like mirroring or parity protection. Instead, the ECS system utilizes erasure coding for data protection, wherein data, a portion of the data, e.g., a data chunk, is broken into fragments, and expanded and encoded with redundant data pieces and then stored across a set of different locations or storage media, e.g., across different storage nodes.

The ECS system can support storage, manipulation, and/or analysis of unstructured data on a massive scale on commodity hardware. As an example, the ECS can support mobile, cloud, big data, and/or social networking applications. In another example, the ECS can be deployed as a turnkey storage appliance, or as a software product that can be installed on a set of qualified commodity servers and disks, e.g., within a node, data storage node, etc. of a cluster, data storage cluster, etc. In this regard, the ECS can comprise a cloud platform that comprises at least the following features: (i) lower cost than public clouds; (ii) unmatched combination of storage efficiency and data access; (iii) anywhere read/write access with strong consistency that simplifies application development; (iv) no single point of failure to increase availability and performance; (v) universal accessibility that eliminates storage silos and inefficient extract, transform, load (ETL)/data movement processes; etc.

In embodiment(s), the cloud-based data storage system can comprise an object storage system, e.g., a file system comprising, but not limited to comprising, a Dell EMC® Isilon file storage system. As an example, a storage engine can write all object-related data, e.g., user data, metadata, object location data, etc. to logical containers of contiguous disk space, e.g., such containers comprising a group of blocks of fixed size (e.g., 128 MB) known as chunks. Data is stored in the chunks and the chunks can be shared, e.g., one chunk can comprise data fragments of different user objects. Chunk content is modified in append-only mode, e.g., such content being protected from being erased or overwritten for a specified retention period. When a chunk becomes full enough, it is sealed, closed, etc. In this regard, content of a sealed, closed, etc. chunk is immutable, e.g., read-only, and after the chunk is closed, the storage engine performs erasure-coding on the chunk.

Reference throughout this specification to "one embodiment," or "an embodiment," means that a particular feature, structure, or characteristic described in connection with the embodiment is included in at least one embodiment. Thus, the appearances of the phrase "in one embodiment," or "in an embodiment," in various places throughout this specification are not necessarily all referring to the same embodiment. Furthermore, the particular features, structures, or characteristics may be combined in any suitable manner in one or more embodiments.

Furthermore, to the extent that the terms "includes," "has," "contains," and other similar words are used in either the detailed description or the appended claims, such terms are intended to be inclusive—in a manner similar to the term "comprising" as an open transition word—without precluding any additional or other elements. Moreover, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As utilized herein, the terms "logic," "logical," "logically," and the like are intended to refer to any information having the form of instruction signals and/or data that may be applied to direct the operation of a processor. Logic may be formed from signals stored in a device memory. Software is one example of such logic. Logic may also be comprised by digital and/or analog hardware circuits, for example, hardware circuits comprising logical AND, OR, XOR, NAND, NOR, and other logical operations. Logic may be formed from combinations of software and hardware. On a network, logic may be programmed on a server, or a complex of servers. A particular logic unit is not limited to a single logical location on the network.

As utilized herein, terms "component," "system," "engine", and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server, client, etc. and the server, client, etc. can be a component. One or more components can reside within a process, and a component can be localized on one computer and/or distributed between two or more computers.

Further, components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. In yet another example, a component can be an apparatus that provides specific functionality through electronic components without mechanical parts; the electronic components can comprise one or more processors therein to execute software and/or firmware that confer(s), at least in part, the functionality of the electronic components.

Aspects of systems, apparatus, and processes explained herein can constitute machine-executable instructions embodied within a machine, e.g., embodied in a computer readable medium (or media) associated with the machine. Such instructions, when executed by the machine, can cause the machine to perform the operations described. Additionally, the systems, processes, process blocks, etc. can be embodied within hardware, such as an application specific integrated circuit (ASIC) or the like. Moreover, the order in which some or all of the process blocks appear in each process should not be deemed limiting. Rather, it should be understood by a person of ordinary skill in the art having the benefit of the instant disclosure that some of the process blocks can be executed in a variety of orders not illustrated.

Furthermore, the word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art having the benefit of the instant disclosure.

The disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can comprise, but are not limited to: random access memory (RAM); read only memory (ROM); electrically erasable programmable read only memory (EEPROM); flash memory or other memory technology (e.g., card, stick, key drive, thumb drive, smart card); solid state drive (SSD) or other solid-state storage technology; optical disk storage (e.g., compact disk (CD) read only memory (CD ROM), digital video/versatile disk (DVD), Blu-ray disc); cloud-based (e.g., Internet based) storage; magnetic storage (e.g., magnetic cassettes, magnetic tape, magnetic disk storage or other magnetic storage devices); a virtual device that emulates a storage device and/or any of the above computer-readable media; or other tangible and/or non-transitory media which can be used to store desired information. In this regard, the terms "tangible" or "non-transitory" herein as applied to storage, memory, or computer-readable media, are to be understood to exclude only propagating transitory signals per se as modifiers and do not relinquish rights to all standard storage, memory or computer-readable media that are not only propagating transitory signals per se.

Artificial intelligence based systems, e.g., utilizing explicitly and/or implicitly trained classifiers, can be employed in connection with performing inference and/or probabilistic determinations and/or statistical-based determinations as in accordance with one or more aspects of the disclosed subject matter as described herein. For example, an artificial intelligence system can be used to determine probabilistic likelihoods that code paths utilize operating system synchronization mechanism, as described herein.

A classifier can be a function that maps an input attribute vector, x=(x1, x2, x3, x4, xn), to a confidence that the input belongs to a class, that is, f(x)=confidence (class). Such classification can employ a probabilistic and/or statistical-based analysis (e.g., factoring into the analysis utilities and costs) to infer an action that a user desires to be automatically performed. In the case of communication systems, for example, attributes can be information received from access points, servers, components of a wireless communication network, etc., and the classes can be categories or areas of interest (e.g., levels of priorities). A support vector machine is an example of a classifier that can be employed. The support vector machine operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein can also be inclusive of statistical regression that is utilized to develop models of priority.

In accordance with various aspects of the subject specification, artificial intelligence based systems, components, etc. can employ classifiers that are explicitly trained, e.g., via a generic training data, etc. as well as implicitly trained, e.g., via observing characteristics of communication equipment, e.g., a server, etc., receiving reports from such communication equipment, receiving operator preferences, receiving historical information, receiving extrinsic information, etc. For example, support vector machines can be configured via a learning or training phase within a classifier constructor and feature selection module. Thus, the classifier(s) can be used by an artificial intelligence system to automatically learn and perform a number of functions, e.g., performed by variance engine 102.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

As it is employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

In the subject specification, terms such as "store," "data store," "data storage," "database," "storage medium," "socket", and substantially any other information storage component relevant to operation and functionality of a system, component, and/or process, can refer to "memory components," or entities embodied in a "memory," or components comprising the memory. It will be appreciated that the memory components described herein can be either volatile memory or nonvolatile memory, or can comprise both volatile and nonvolatile memory.

By way of illustration, and not limitation, nonvolatile memory, for example, can be included in a data storage cluster, non-volatile memory 1022 (see below), disk storage 1024 (see below), and/or memory storage 1046 (see below). Further, nonvolatile memory can be included in read only memory (ROM), programmable ROM (PROM), electrically programmable ROM (EPROM), electrically erasable ROM (EEPROM), or flash memory. Volatile memory 1020 can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Figure 10:
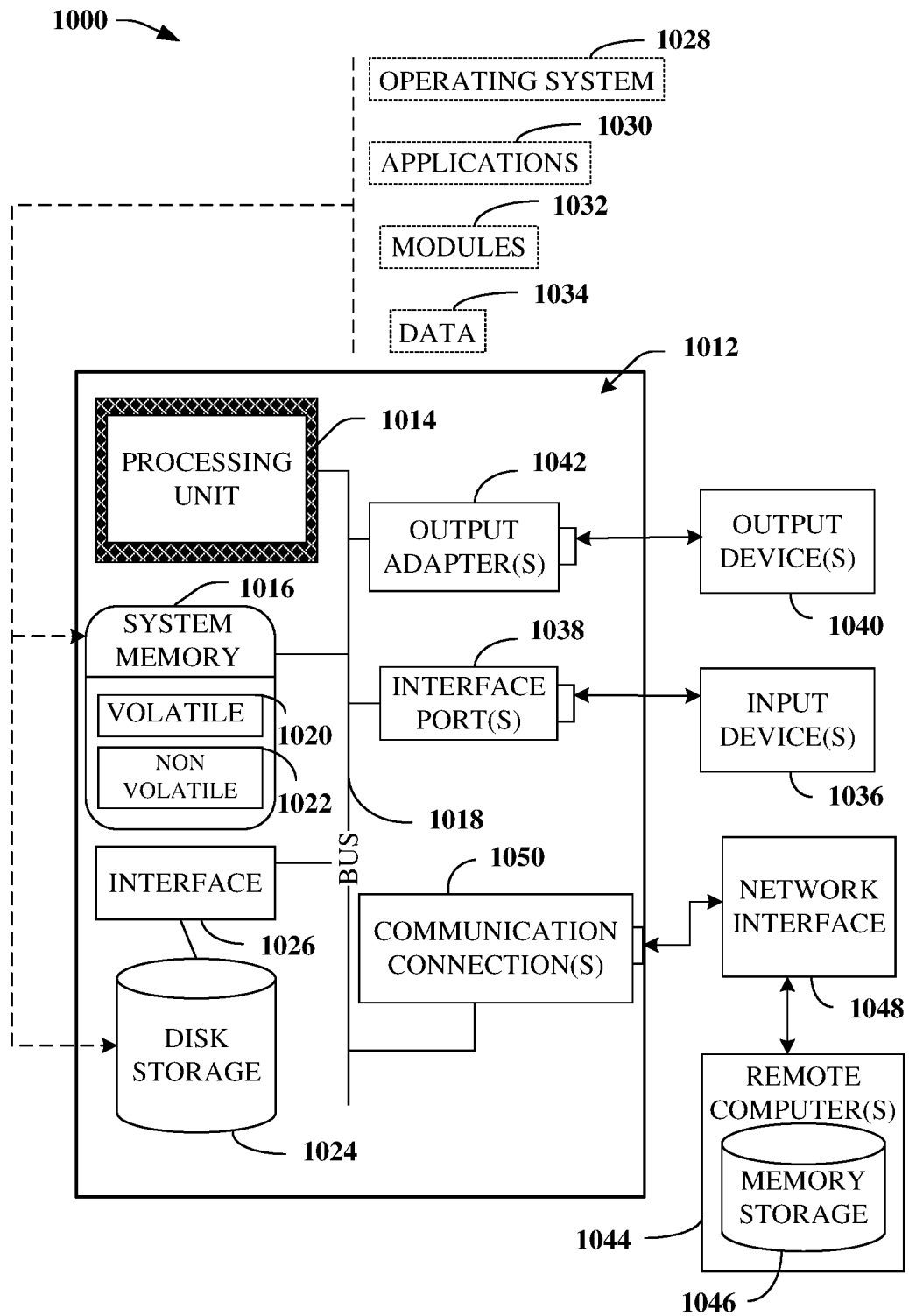
FIG. 10 illustrates a block diagram representing an illustrative non-limiting computing system or operating environment in which one or more aspects of various embodiments described herein can be implemented.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that various embodiments disclosed herein can be implemented in combination with other program modules. Generally, program modules comprise routines, programs, components, data structures, etc. that perform particular tasks and/or implement particular abstract data types.

Moreover, those skilled in the art will appreciate that the inventive systems can be practiced with other computer system configurations, comprising single-processor or multiprocessor computer systems, computing devices, mini-computing devices, mainframe computers, as well as personal computers, hand-held computing devices (e.g., PDA, phone, watch), microprocessor-based or programmable consumer or industrial electronics, and the like. The illustrated aspects can also be practiced in distributed computing environments where tasks are performed by remote processing devices that are linked through a communication network; however, some if not all aspects of the subject disclosure can be practiced on stand-alone computers. In a distributed computing environment, program modules can be located in both local and remote memory storage devices.

With reference to FIG. 10, a block diagram of a computing system 1000, e.g., system 100, operable to execute the disclosed systems and methods is illustrated, in accordance with an embodiment. Computer 1012 comprises a processing unit 1014, a system memory 1016, and a system bus 1018. System bus 1018 couples system components comprising, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) comprising a memory bus or a memory controller, a peripheral bus or an external bus, and/or a local bus using any variety of available bus architectures comprising, but not limited to, industrial standard architecture (ISA), micro-channel architecture (MSA), extended ISA (EISA), intelligent drive electronics (IDE), VESA local bus (VLB), peripheral component interconnect (PCI), card bus, universal serial bus (USB), advanced graphics port (AGP), personal computer memory card international association bus (PCMCIA), Firewire (IEEE 1394), small computer systems interface (SCSI), and/or controller area network (CAN) bus used in vehicles.

System memory 1016 comprises volatile memory 1020 and nonvolatile memory 1022. A basic input/output system (BIOS), containing routines to transfer information between elements within computer 1012, such as during start-up, can be stored in nonvolatile memory 1022. By way of illustration, and not limitation, nonvolatile memory 1022 can comprise ROM, PROM, EPROM, EEPROM, or flash memory. Volatile memory 1020 comprises RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1012 also comprises removable/non-removable, volatile/non-volatile computer storage media. FIG. 10 illustrates, for example, disk storage 1024. Disk storage 1024 comprises, but is not limited to, devices like a magnetic disk drive, floppy disk drive, tape drive, Jaz drive, Zip drive, LS-100 drive, flash memory card, or memory stick. In addition, disk storage 1024 can comprise storage media separately or in combination with other storage media comprising, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to system bus 1018, a removable or non-removable interface is typically used, such as interface 1026.

It is to be appreciated that FIG. 10 describes software that acts as an intermediary between users and computer resources described in suitable operating environment 1000. Such software comprises an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be appreciated that the disclosed subject matter can be implemented with various operating systems or combinations of operating systems.

A user can enter commands or information into computer 1012 through input device(s) 1036. Input devices 1036 comprise, but are not limited to, a pointing device such as a mouse, trackball, stylus, touch pad, keyboard, microphone, joystick, game pad, satellite dish, scanner, TV tuner card, digital camera, digital video camera, web camera, cellular phone, user equipment, smartphone, and the like. These and other input devices connect to processing unit 1014 through system bus 1018 via interface port(s) 1038. Interface port(s) 1038 comprise, for example, a serial port, a parallel port, a game port, a universal serial bus (USB), a wireless based port, e.g., Wi-Fi, Bluetooth, etc. Output device(s) 1040 use some of the same type of ports as input device(s) 1036.

Thus, for example, a USB port can be used to provide input to computer 1012 and to output information from computer 1012 to an output device 1040. Output adapter 1042 is provided to illustrate that there are some output devices 1040, like display devices, light projection devices, monitors, speakers, and printers, among other output devices 1040, which use special adapters. Output adapters 1042 comprise, by way of illustration and not limitation, video and sound devices, cards, etc. that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, a workstation, a microprocessor based appliance, a peer device, or other common network node and the like, and typically comprises many or all of the elements described relative to computer 1012.

For purposes of brevity, only a memory storage device 1046 is illustrated with remote computer(s) 1044. Remote computer(s) 1044 is logically connected to computer 1012 through a network interface 1048 and then physically and/or wirelessly connected via communication connection 1050. Network interface 1048 encompasses wire and/or wireless communication networks such as local-area networks (LAN) and wide-area networks (WAN). LAN technologies comprise fiber distributed data interface (FDDI), copper distributed data interface (CDDI), Ethernet, token ring and the like. WAN technologies comprise, but are not limited to, point-to-point links, circuit switching networks like integrated services digital networks (ISDN) and variations thereon, packet switching networks, and digital subscriber lines (DSL).

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can comprise, for example, internal and external technologies such as modems, comprising regular telephone grade modems, cable modems and DSL modems, wireless modems, ISDN adapters, and Ethernet cards.

The computer 1012 can operate in a networked environment using logical connections via wired and/or wireless communications to one or more remote computers, cellular based devices, user equipment, smartphones, or other computing devices, such as workstations, server computers, routers, personal computers, portable computers, microprocessor-based entertainment appliances, peer devices or other common network nodes, etc. The computer 1012 can connect to other devices/networks by way of antenna, port, network interface adaptor, wireless access point, modem, and/or the like.

The computer 1012 is operable to communicate with any wireless devices or entities operatively disposed in wireless communication, e.g., a printer, scanner, desktop and/or portable computer, portable data assistant, communications satellite, user equipment, cellular base device, smartphone, any piece of equipment or location associated with a wirelessly detectable tag (e.g., scanner, a kiosk, news stand, restroom), and telephone. This comprises at least Wi-Fi and Bluetooth wireless technologies. Thus, the communication can be a predefined structure as with a conventional network or simply an ad hoc communication between at least two devices.

Wi-Fi allows connection to the Internet from a desired location (e.g., a vehicle, couch at home, a bed in a hotel room, or a conference room at work, etc.) without wires. Wi-Fi is a wireless technology similar to that used in a cell phone that enables such devices, e.g., mobile phones, computers, etc., to send and receive data indoors and out, anywhere within the range of a base station. Wi-Fi networks use radio technologies called IEEE 802.11 (a, b, g, etc.) to provide secure, reliable, fast wireless connectivity. A Wi-Fi network can be used to connect communication devices (e.g., mobile phones, computers, etc.) to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating there from. Therefore, the disclosed subject matter should not be limited to any single embodiment described herein, but rather should be construed in breadth and scope in accordance with the appended claims below.

What is claimed is:
1. A system, comprising:
a processor; and
a memory that stores executable instructions that, when executed by the processor, facilitate performance of operations, comprising:
determining a number of volume slices associated with a storage volume of a group of storage volumes;
dividing the storage volume into the number of volume slices;
assigning a first volume slice of the number of volume slices for use by a first resource type data, assigning a second volume slice of the number of volume slice for use by a second resource type data, assigning a third volume slice of the number of volume slices for use by a third resource type data, assigning a fourth volume slice of the number of volume slices for use by a fourth resource type data, and assigning a remainder of the number of volume slices as being free volume slices;
based on a storage capacity of the storage volume, generating a virtual file system address space;
partitioning the virtual file system address space into a first subspace based on the first resource type data, a second subspace based the second resource type data, a third subspace based on the third resource type data, and a fourth subspace based on the fourth resource type data;
provisioning the first subspace with the first volume slice, provisioning the second subspace with the second volume slice, provisioning the third subspace with the third volume slice, and provisioning the fourth subspace with the fourth volume slice;
reserving, based on a defined free volume slice allocation pattern, at least a first free volume slice of the free volume slices for use by the first resource type data, reserving at least a second free volume slice of the free volume slices for use by the second resource type data, reserving at least a third free volume slice of the free volume slices for use by the third resource type data, reserving at least a fourth free volume slice of the free volume slices for use by the fourth resource type data, and maintaining, as unaffiliated with any resource type data, at least a fifth free volume slice of the free volume slices;
facilitating read and write access to the virtual file system address space;
determining that the first volume slice has become full or near full;
in response to the determining that the first volume slice has become full or near full, provisioning the first subspace with at least the first free volume slice, the provisioning comprising:
determining whether a synchronization mechanism is to be used to prevent access to the virtual file system address space comprising determining whether at least the first free volume slice remains reserved, based on the defined free volume slice allocation pattern, for the use by the first resource type data; and based on determining that the synchronization mechanism is not to be used to prevent the access to the virtual file system address space comprising determining that at least the first free volume slice remains reserved for the use by the first resource type data, performing the provisioning without instantiating the synchronization mechanism;

determining whether the provisioning of at least the first free volume slice has exhausted, or nearly exhausted, available volume slices usable for the first resource type data; and in response to determining that the provisioning of at least the first free volume slice has exhausted, or nearly exhausted, the available volume slices usable for the first resource type data, identifying at least one of at least the fifth free volume slice that has remained unaffiliated with any resource type data, and associating the at least one of at least the fifth free volume slice with the first resource type data for use in further provisioning of the first subspace.

2. The system of claim 1, wherein the determining whether the synchronization mechanism is to be used to prevent the access to the virtual file system address space comprises determining that assignment of the first volume slice to the first resource type data is to change to being assigned to a different resource type data according to a rebalancing of the defined free volume slice allocation pattern, and wherein the operations further comprise, in response to determining that the assignment of the first volume slice to the first resource type data is to change to being assigned to the different resource type data, instantiating the synchronization mechanism, changing the assignment of the first volume slice to the different resource type data, and releasing the synchronization mechanism.

3. The system of claim 1, wherein the operations further comprise determining that the first free volume slice, reserved based on the defined free volume slice allocation pattern, is insufficient to provision the first subspace.

4. The system of claim 3, wherein the operations further comprise:

determining that the synchronization mechanism is to be used to prevent the access to the virtual file system address space comprising determining that the first volume slice is to change, before the provisioning of the first volume slice, from being assigned to the first resource type data to being assigned to a different resource type data than the first resource type data; and in response to determining that the synchronization mechanism is to be used to prevent the access to the virtual file system address space, initiating the synchronization mechanism to prevent the access to the virtual file system address space, and maintaining the synchronization mechanism until the first volume slice has been changed from being assigned to the first resource type data to being assigned to the different resource type data.

5. The system of claim 4, wherein the operations further comprise reallocating at least one of the fourth free volume slice to be used as the first free volume slice.

6. The system of claim 5, wherein the operations comprise releasing the synchronization mechanism to permit the access to the virtual file system address space.

7. The system of claim 6, wherein the synchronization mechanism is a spinlock directive.

8. The system of claim 1, wherein the first subspace is used to store inode type data.

9. The system of claim 1, wherein the second subspace, the third subspace, and the fourth subspace are larger than the first subspace.

10. The system of claim 1, wherein the defined free volume slice allocation pattern is based on a ratio of a relative size of each of the first subspace, the second subspace, the third subspace, and the fourth subspace.

11. The system of claim 1, wherein each of the first free volume slice, the second free volume slice, the third free volume slice, the fourth free volume slice, and each of the remainder of the number of volume slices comprise a defined number of data blocks.

12. The system of claim 1, wherein the operations further comprise determining that the fourth volume slice is becoming full and determining that the synchronization mechanism is further not to be used to prevent access to the fourth subspace, provisioning the fourth subspace with the fourth free volume slice without using the synchronization mechanism to prevent the access to the fourth subspace.

13. A method, comprising:

partitioning, by a device comprising a processor, a virtual file system address space into a first subspace based on first resource usage type data and a second subspace based on second resource type usage type data;

provisioning, by the device, the first subspace with a first volume slice of a group of volume slices associated with the first resource usage type data, and provisioning, by the device, the second subspace with a second volume slice of the group of volume slices associated with the second resource type usage data, wherein group of volume slices comprises the first volume slice, the second volume slice, a collection of reserved volume slices that are allocated between the first volume slice and the second volume slice based on a defined distribution allocation pattern that allocates the first volume slice and the second volume slice as a function of quantitative relationship between a first number value associated with the first volume slice and a second number value associated with the second volume slice, and at least an unaffiliated volume slice that remains unaffiliated with any resource usage type data;

determining, by the device, that a data block count associated the second volume slice is insufficient to service a write operation of user data to the second volume slice;

in response to the determining that the second volume slice has become full or near full, determining, by the device, whether a memory synchronization that excludes access to the second volume slice is to be used comprising determining whether a free volume slice, of the collection of reserved volume slices, remains reserved, based on the defined distribution allocation pattern, for use with the second resource usage type data;

based on determining that the memory synchronization is not to be used comprising determining that the free volume slice remains reserved for the use with the second resource usage type data, provisioning, by the device, the second subspace with the free volume slice associated with the second resource usage type data;

determining whether the provisioning of the second subspace with at least the free volume slice has exhausted, or nearly exhausted, available volume slices usable for the second resource usage type data; and in response to determining that the provisioning of the second subspace with at least the free volume slice has exhausted, or nearly exhausted, the available volume slices usable for the second resource usage type data, identifying at least one of at least the unaffiliated volume slice that has remained unaffiliated with any resource usage type data, and associating the at least one of at least the unaffiliated volume slice with the second resource usage type data for use in further provisioning of the second subspace.

14. The method of claim 13, wherein the free volume slice is a second free volume slice, and further comprising determining, by the device, that a first free volume slice of the collection of reserved free volume slices associated with the first resource usage type data is insufficient to provision the first subspace.

15. The method of claim 14, wherein the determining whether the memory synchronization that excludes the access to the second volume slice is to be used comprises determining that assignment of the second volume slice to the second resource usage type data is to change to being assigned to a different resource usage type data according to a rebalancing of the defined distribution allocation pattern, and further comprising, in response to determining that the assignment of the second volume slice to the second resource usage type data is to change to being assigned to the different resource usage type data, instantiating, by the device, the synchronization mechanism, and changing, by the device, the assignment of the first volume slice to the different resource usage type data.

16. The method of claim 15, further comprising reassigning, by the device, the second free volume slice to be a third free volume slice of the collection of reserved free volume slices associated with the first resource usage type data.

17. The method of claim 16, further comprising releasing, by the device, the memory synchronization and allowing, by the device, access to the virtual file system address space.

18. A non-transitory machine-readable medium comprising instructions that, in response to execution, cause a system comprising a processor to perform operations, comprising:
dividing a virtual file system address space into a first subspace based on first resource usage type data and a second subspace based on second resource type usage type data;
initializing the first subspace with a first volume slice of a group of volume slices associated with the first resource usage type data, and initializing the second subspace with a second volume slice of the group of volume slices associated with the second resource usage type data, wherein group of volume slices comprises the first volume slice, the second volume slice, a collection of reserved volume slices that are allocated between the first volume slice and the second volume slice based on a defined allocation pattern that allocates the first volume slice and the second volume slice as a function of a quantitative relationship between a first number value associated with the first volume slice and a second number value associated with the second volume slice, and at least an unaffiliated volume slice that remains unaffiliated with any resource usage type data;
determining that a data block count associated the second volume slice is insufficient to service a write operation of user data to the second volume slice;
in response to the determining that the second volume slice has become full or near full, determining whether a memory exclusion process is to be used to exclude access to the second volume slice comprising determining whether a free volume slice, of the collection of reserved volume slices, remains reserved, based on the defined allocation pattern, for use with the second resource usage type data;
based on determining that the memory exclusion process is not to be used comprising determining that the free volume slice remains reserved for the use with the second resource usage type data, provisioning the second subspace with the free volume slice associated with the second resource usage type data;
determining whether the provisioning of the second subspace with at least the free volume slice has exhausted, or nearly exhausted, available volume slices usable for the second resource usage type data; and
in response to determining that the provisioning of the second subspace with at least the free volume slice has exhausted, or nearly exhausted, the available volume slices usable for the second resource usage type data, identifying at least one of at least the unaffiliated volume slice that has remained unaffiliated with any resource usage type data, and associating the at least one of at least the unaffiliated volume slice with the second resource usage type data for use in further provisioning of the second subspace.

19. The non-transitory machine-readable medium of claim 18, wherein the first resource usage type data is associated with inode type data.

20. The non-transitory machine-readable storage medium of claim 18, wherein the operations further comprise determining, according to a sufficiency criterion, that the data block count associated the second volume slice is sufficient, without invoking the memory exclusion process, to service the write operation of the user data to the second volume slice.

* * * * *